April 3, 1945.  T. P. BACON  2,372,644
TIRE MOLD
Filed Dec. 7, 1942  3 Sheets-Sheet 1

INVENTOR.
THOMAS P. BACON
BY George B. White
ATTORNEY.

April 3, 1945.  T. P. BACON  2,372,644
TIRE MOLD
Filed Dec. 7, 1942  3 Sheets-Sheet 2

INVENTOR.
THOMAS P. BACON
BY George B. White

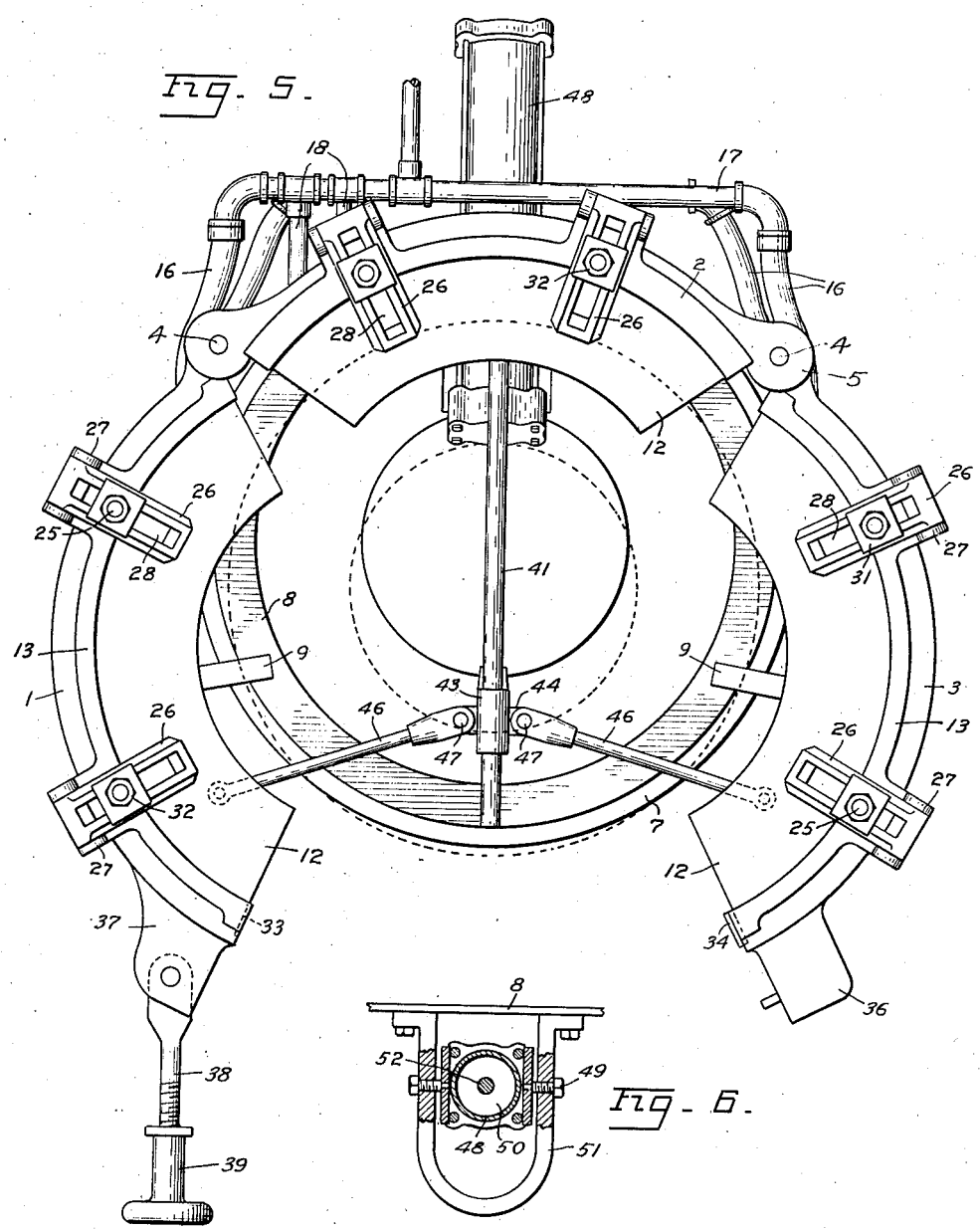

Patented Apr. 3, 1945

2,372,644

UNITED STATES PATENT OFFICE 2,372,644

TIRE MOLD

Thomas P. Bacon, Oakland, Calif.

Application December 7, 1942, Serial No. 468,317

6 Claims. (Cl. 18—18)

This invention relates to tire molds.

The primary object of the invention is to provide a tire mold, and particularly the type of mold which is used for retreading or recapping tires, in which both the width and the diameter of the vulcanizing cavity in the mold can be easily varied so as to fit the tread of the tire.

Another object of this invention is to provide a tire mold which automatically separates the vulcanized tire from the vulcanizing surfaces of the mold when the mold is opened after the vulcanizing operation is completed.

Another object of this invention is to provide a sectional tire mold in each of the sections of which are suitable replaceable matrices complementing each other to a full circle molding cavity all around the tire periphery so as to fit the tread circumference of the tire; each of the matrix sections is also split longitudinally so as to permit the varying of the width of the matrices by suitable inserts between the split matrix sections; means being provided to positively hold the matrix sections in position in the mold.

Another object of the invention is to provide a tire mold which can be quickly adjusted to tires of various tread diameters and width, so that the mold is fitted to the tire to be vulcanized, without any necessity of expanding the tire in the mold by movable pressure elements or the like; said mold can be efficiently clamped all around the tread circumference in firm curing contact; the tire being loosened and ejected from the matrices automatically by the force of the opening of the mold and matrix sections; and various novel mechanisms being provided for efficiently accomplishing the objects of the herein invention.

The drawings and the specification herein show the perfected embodiment of my invention, but the invention may be constructed in various modified forms and with structural changes, without departing from the spirit of the invention.

With the foregoing and other objects in view, which will be made manifest in the following detailed description, reference is had to the accompanying drawings for the illustrative embodiment of the invention, wherein:

Fig. 5 is a top plan view showing the mold sections open and the ejector mechanism in ejecting position, the broken lines indicating the outline of the tire in the mold.

Fig. 6 is a fragmental sectional view of the mechanism for opening and closing of the mold, and its pivotal mounting.

Figure 1:
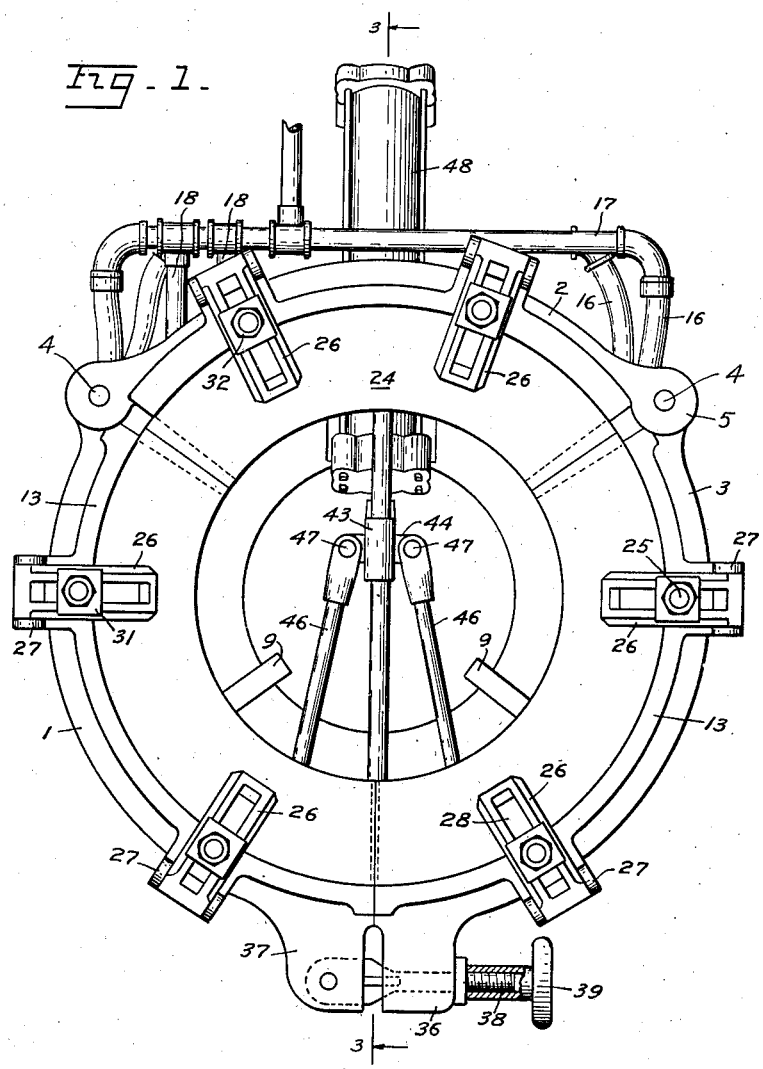
Fig. 1 is a top plan view of my mold, showing the mold closed.

In the herein preferred form of the invention, three sectional molds 1, 2 and 3 are connected to each other by vertical pivot pins 4 which extend through suitable interlocking lugs 5 at the opposite ends of the middle section 2, so that the outer sections 1 and 3 can be swung outwardly into the position shown in Fig. 5. The middle section 2 is fixedly supported by bolts or the like on a suitable stand 6. This stand 6 in the present form is made in the form of a hollow column flared outwardly at its bottom and terminating in a bottom floor flange 7. The top of this hollow stand 6 is also flared and terminates at its top in a circular supporting flange 8. The fixed middle section 2 of the mold is secured to this supporting flange 8 of the stand 6. Each of the outside movable sections 1 and 3 have guide arms 9 extended inwardly from the bottoms thereof, which guide arms 9 slidably rest upon the supporting flange 8 so as to guide and support the movable mold sections 1 and 3 in all adjusted positions.

Each of the mold sections is preferably constructed of an arcuate mold frame 11 having two walls substantially at right angles to one another. The base wall 12 of this mold frame 11 extends parallel with the supporting flange 8 of the stand 6. The arcuate side wall 13 of each mold section forms the outer periphery of the mold section. In the present illustration the mold sections are heated by suitable steam conduits 14 extended within the side 13 of the mold frame. Steam conduits 14 are cast into the sides 13 of the mold frame. The intake and outlet ends of these steam conduits 14 of the movable mold sections 1 and 3, are located respectively near the pivoted ends thereof and are connected by flexible conduits 16 to suitable piping 17 respectively leading to the steam supply and to the drainage of a suitable heating supply system. The inlet and outlet ends of the steam conduits 14 in the middle section 2 may be located at any suitable place and are connected by fixed conduits 18 to the piping 17. It is to be noted that each of the mold sections has its own heat circulation separately connected to the piping 17 and to the heat supply, so that steam can be circulated through the mold sections in both the open and closed positions of the mold sections.

In order to eliminate the necessity for fitting the tire to the mold, removable split and sectional matrices are provided in the respective mold sections. The tire is suitably prepared for retreading or recapping in the usual manner, for instance, in the present practice the tire is rasped, provided with cement and a strip of so-called camelback for the new tread. Then a matrix is selected so that the inner periphery of the matrix cavity is of somewhat smaller diameter than the outer periphery of the prepared tire. In this manner complete curing contact can be accomplished by firmly clamping the matrices in the mold sections against the tread portion of the tire. These matrices or inserts in the mold sections are substantially of the same length and of the same arc as the inner peripheries of the mold sections and the ends thereof are cut at such radial angles as to supplement each other into a complete circle when the mold sections are closed and clamped around the tire.

In view of the fact that there is also a variation in the widths of tires of equal diameter, the removable matrices are made of longitudinal sections 19, one of which rests upon the mold section base 12 and the other is placed on the top of the same so as to form the complete matrix. Each longitudinal matrix section 19 has inwardly extended flanges 21, the inner sides of which taper axially outwardly and toward the inner peripheries of the respective flanges 21 so as to accommodate the usual shoulders and part of the sides of the tire to be treaded. The inner peripheries of the longitudinal matrix sections are provided with suitable projections 22 for furnishing the tread design impressions on the tire tread. The width of the matrix can be adjusted and varied by the insertion of spacer sections 23 between the meeting sides of the longitudinal matrix sections 19. In preparing the mold for recapping or retreading of a tire of a particular size, one of the longitudinal matrix sections 19 is placed in each of the mold sections 1, 2 and 3 so that the flange 21 thereof rests upon the base 12 and the outer periphery of the section is against the inner periphery of the side 13. Then, if necessary, a spacer rim section 23 is placed on the top of this longitudinal matrix section 19, and then the other longitudinal matrix section 19 is placed in an inverted position on the spacer rim 23 so that its flange 21 forms the other confining flange of the matrix.

The matrix sections are held in place by releasable pressure clamps. A sectional heat insulating cover 24 is placed on the top of each of the top sections 19. A clamp 26 is pivoted at its outer end on a bracket 27 on the mold side 13 and is swingable to a position where its other end bears against the heat insulating cover 24. A threaded bar 25 extends from the top of each mold frame side 13 and through a slot 28 in each clamp 26. A coil spring 29 between each clamp 26 and the top of the mold side 13 urges the clamp away from the matrices. A washer 31 is pressed by a nut 32 against the other side of each clamp 26 for pressing the clamp 26 against the cover 24 and matrix sections 19. Each clamp 26 is pressed down or released by the turning of the nut 32 in the respective directions on the bar 27. The slot 28 is of sufficient length to allow the swinging of each clamp 26 over the threaded bar 27 to an out of way position, thereby permitting the changing of the curing cavity by the replacement of the matrix sections 19.

In order to further assure true alignment of the mold sections 1 and 3, the outer end of the movable section 1 is provided with a pair of substantially radial dents 33 and the outer end of the other movable section 3 is provided with a pair of fixed pins 34 so located as to engage the dents 33 when the sections are closed in true alignment.

Figure 2:
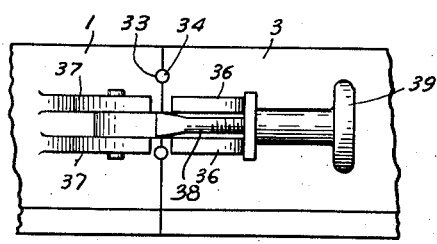
Fig. 2 is a fragmental side view of the clamping means for the mold.

The sections are held in closed position by suitable fastening means. In this illustration, on the outer end of section 3 there are a pair of outwardly extended spaced lugs 36. The outer end of section 1 has outwardly extended spaced lugs 37 so arranged that the space between the lugs 37 is in registry with the space between the lugs 36 when the mold is closed. A fastening bar 38 is pivoted between the lugs 37 so that it can be swung over into a position between the other pair of lugs 36 as shown in Fig. 2. This bar 38 is threaded and a fastening head 39 is provided on the threaded end of the bar 38 so that after the bar 38 is swung between the lugs 36 of section 3, then by tightening the fastening head 39 against the lugs 36 the ends of the movable sections 1 and 3 can be firmly forced into contact and the mold sections thus held in a curing position.

A feature of the herein described mold is the mechanism for simultaneously swinging the movable sections 1 and 3 into open and closed positions, and also the loosening of the tire from the mold simultaneously with the opening of the mold sections 1 and 3. A guide 41 is extended diametrically from the center of the bottom of the fixed mold 2 across the top of the stand 6. This guide 41 is held in a suitable socket 42 in the under side of the bottom of the fixed mold 2. On this guide 41 is a sliding block 43 which has opposed lateral ears 44. On each ear 44 is pivoted an end of a link 46. The other end of one of the links 46 is pivoted to the base 12 of the movable section 1 near the free end of said section. The other link 46 is pivoted at its outer end to the base 12 of the mold section 3 at the same distance from the free end of said section 3 as the distance of the pivot from the free end of section 1. The links 46 are positioned at such angles that when the sliding block 43 is at the end of its stroke, as shown in Fig. 1, then the movable sections 1 and 3 are closed to form the complete circle mold. By moving the sliding block 43 in a direction away from the fixed mold section 2, the movable sections 1 and 3 are forced by the links 46 away from the tire and into the open position, as shown in Fig. 5.

The loosening or ejection of the tire from the mold is performed simultaneously with the opening of the mold by pins 47, which are an extension of the respective pivots of the links 46 on the sliding block 43. These pins 47 extend from below the level of the tire to such a height that they are opposite the inner periphery of the rim of the tire in the mold. The angle of the links 46 is such that the sliding block 43 in its outermost opening position is beyond the position of the rim of the tire in the mold. Consequently, before the sliding block 43 reaches the position where the movable sections 1 and 3 are in fully opened position, the ejector pins 47 are abutted against the rim of the tire, indicated in broken lines in Fig. 5, and the force thus exerted against the rim of the tire pulls the tire away from the fixed mold section 2. This obviates the necessity of the prying and twisting of the tire in order to break the adhesion between the freshly cured tire tread and the respective matrices. The tire is completely loosened from all the mold sections by the same force which is exerted for the opening of the mold.

Figure 3:
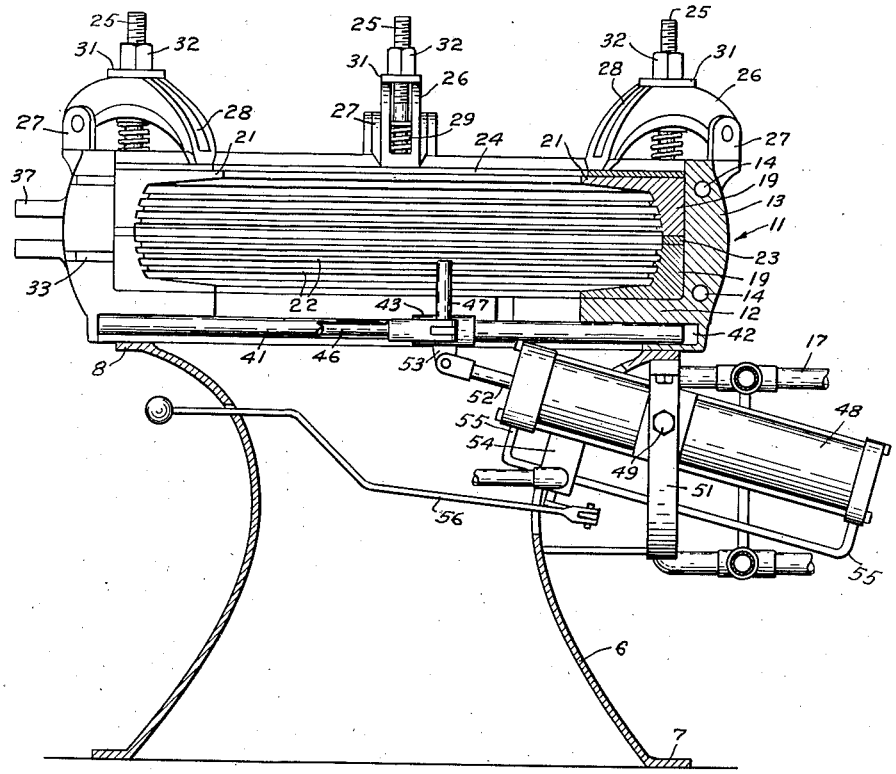
Fig. 3 is a sectional view of the mold, the section being taken on the lines 3—3 of Fig. 1, except that the ejector mechanism of the mold is shown in elevation.
Figure 4:
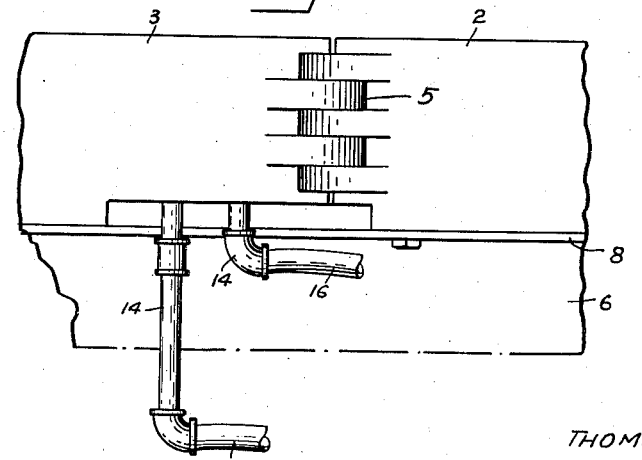
Fig. 4 is a fragmental detailed view of the portion of the mold where the adjacent sections of the mold are hinged together.

In the present illustration, power is applied to the sliding block 43 by a suitable hydraulic or pneumatic mechanism. This mechanism includes a cylinder 48 which is pivoted on a transverse pivot 49, which latter is supported on a bracket 51 extending from the supporting flange 8 of the stand 6. This bracket 51 is located beneath the middle of the fixed mold section 2. In the cylinder 48 works the usual piston 50, as shown in Fig. 6. The piston rod 52 is pivoted to an ear 53 which extends from the sliding block 43 toward the stand 6. The flow of the pressure medium into the cylinder 48 on the opposite sides of the piston 50 is controlled by a suitable valve diagrammatically indicated at 54. This valve 54 is actuated by a suitable handle 56 which extends across the base to a convenient position where the operator of the mold may easily manipulate it. The pressure medium is conducted to the respective ends of the cylinder 48 by suitable conduits 55 leading from the valve 54 to the respective ends of the cylinder 48, as shown in Fig. 3. By pulling the handle 56 toward the front of the mold, the valve 54 is so turned that the pressure medium is introduced into the lowest end of the cylinder 48, and the piston 49 moves the rod 52 outwardly from the cylinder 48 and the sliding block 43 is pushed in a direction away from the fixed mold section 2, thereby opening the movable mold sections 1 and 3 and loosening the tire in the manner heretofore described. When a tire is placed in the mold, then the operator pushes the handle 56 in the general direction of the fixed mold section 2, thereby admitting the pressure medium to the side of the piston 49 nearer to the mold so as to move said piston 49 and the piston rod 42 inwardly of the cylinder 48 and thereby to pull the sliding block 43 toward the fixed mold section 2 for closing the movable mold sections 1 and 3 in the manner heretofore described. The valve 54 may be of any suitable construction, but preferably it is of such type that it can be held in a neutral position and operated intermittently in opposite directions or intermittently in either direction, so that the movable mold sections 1 and 3 and the sliding block 43 may be stopped in any suitable position as may be required in the operation of the mold.

In view of the lineal movement of the sliding block 43, it is necessary that the angular position of the piston rod 52 change. In this illustration, this change of angular position is accomplished by the pivotal adjustment of the cylinder 48 around its transverse pivot 49.

In the operation of the mold, the tire is suitably prepared, the sectional matrices are selected to fit the tire and are placed in the respective mold sections and clamped in position by the pressure of the top clamps 26. The prepared tire is placed in the mold so that it is suitably centered in the mold and a portion of it is within the matrices of the fixed mold section 2. Then by pushing the handle 56 intermittently, the hydraulic mechanism moves the block 43 toward the fixed section 2 so as to gradually close the movable mold sections 1 and 2 around the periphery of the tire. Then the free ends of the movable mold sections 1 and 2 are fastened together as heretofore described and the tire is subjected to the curing heat. After the tire is cured for a required period, the handle 56 is pulled by the operator so that the hydraulic mechanism moves the sliding block 53 in a direction away from the fixed mold section 2, opens the movable mold sections 1 and 3 and loosens the tire from the mold in the manner heretofore described.

I claim:

1. A tire mold comprising, a fixed mold section, a movable mold section pivoted to each end of the fixed mold section, said sections being movable into end to end position so as to form a full circle mold, each of said sections having a base and an arcuate side forming a matrix support open at the side opposite said base, a matrix section in each mold section insertable and removable through said open side, each matrix section comprising a pair of superimposed arcuate matrix segments, one of said segments resting on said base and the other segment resting on the first segment so as to form the curing cavity in each section, and releasable clamps on the mold sections to hold the superimposed matrix segments on said base, each of said releasable clamps including a clamp arm pivoted on the mold section so as to be swingable over the open side of said mold section, the free end of the clamp arm extending to the matrix, an element extended from each mold section through each clamp arm, each clamp arm being slotted so as to allow the swinging of the clamp arm over said element into an out of way position, and adjustable means on each element to secure its clamp arm against said matrix.

2. A tire mold comprising, a fixed mold section, a movable mold section pivoted to each end of the fixed mold section, said sections being movable into end to end position so as to form a full circle mold, a base flange on one side of each of said sections extending toward the center of the mold, the other side of each section being open, matrix section in each mold section held on said base flange and being removable through said open side, flanges extending from the opposite arcuate sides of each matrix section toward the center of the mold so as to overlie the sides of the tire, a removable disc section covering the flange of each matrix section at the open side of each mold section, and individual clamping means on each mold section to press said disc sections onto the respective matrix sections.

3. A tire mold comprising, a fixed mold section, a movable mold section pivoted to each end of the fixed mold section, said sections being movable into end to end position so as to form a full circle mold, means in said sections to form an annular curing cavity in said mold, a mechanism for the simultaneous opening and closing of said movable mold sections including a member connected to each movable mold section, means to simultaneously move said members for moving said sections to open and closed positions, an actuating device for said moving means, and means on said mechanism to engage the tire in the mold when the mold is opened so as to loosen the tire from the matrices.

4. The combination with a mold formed of a plurality of complemental arcuate sections forming a full circle molding cavity, certain of said sections being swingable into open and closed positions; of an actuating mechanism for said sections comprising a plurality of arms, one arm being connected to each movable mold section, a member for simultaneously moving all the arms so as to swing said movable sections into open and closed positions, means to impart movement to said member, control means for said movement imparting means, and means at about the connection between said member and said arms for engaging the inside of a tire in said mold so as to loosen said tire and move it from said mold sections.

5. The combination with a mold formed of a plurality of complemental arcuate sections forming a full circle molding cavity; of a moving mechanism for said sections comprising a plurality of arms, a base for the mold, one of said sections being secured to said base, the other sections being swingable into mold opening and closing positions, a guide on said base, a member movable on said guide toward to and away from said secured mold section, one end of each arm being pivoted to one of said movable sections, the other end of each arm being pivotally connected to said member, means to impart movement to said member in opposite directions on said guide so as to swing said movable sections into open and closed positions, and abutments extended from the pivots of said arms at said member so as to abut the inside of said tire at points about diametrically opposite to said secured mold section when the swingable mold sections reach a substantially open position so as to loosen said tire from said mold.

6. In a tire vulcanizing mold of the character described, a stand, a plurality of complemental arcuate mold sections forming a full circle mold, one of said sections being secured to said stand, the other sections being swingable into open position relatively to the fixed section; a base on the side of each section adjacent said stand, the other side of each section being unobstructed, matrices inserted into the respective sections through said unobstructed sides so as to rest on said base, flanges on said matrices extending over the sides of the tire so as to prevent the bulging of the tire, the flanges on the sides adjacent said base being backed by said base, means on each mold section releasably backing the flanges of the matrices on the otherwise unobstructed side of each section, and means to move said swingable mold sections with the matrices and clamping means thereon to open and closed positions.

THOMAS P. BACON.